United States Patent
Kolbasuk et al.

(10) Patent No.: US 10,850,483 B2
(45) Date of Patent: Dec. 1, 2020

(54) BARRIER TAPE FOR SEAMING AND REPAIR OF BARRIER SHEETS

(71) Applicant: Raven Industries, Inc., Sioux Falls, SD (US)

(72) Inventors: Gary Kolbasuk, Sioux Falls, SD (US); Tom Stoebner, Sioux Falls, SD (US); Dan Smith, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 16/026,907

(22) Filed: Jul. 3, 2018

(65) Prior Publication Data

US 2018/0311942 A1 Nov. 1, 2018

Related U.S. Application Data

(62) Division of application No. 15/052,448, filed on Feb. 24, 2016, now abandoned.

(60) Provisional application No. 62/119,864, filed on Feb. 24, 2015.

(51) Int. Cl.
*B32B 27/32* (2006.01)
*B32B 27/30* (2006.01)
*B32B 27/08* (2006.01)
*E02D 31/00* (2006.01)
*B32B 7/12* (2006.01)
*B32B 25/08* (2006.01)
(Continued)

(52) U.S. Cl.
CPC ........... *B32B 27/32* (2013.01); *B32B 7/12* (2013.01); *B32B 25/08* (2013.01); *B32B 27/08* (2013.01); *B32B 27/20* (2013.01); *B32B 27/306* (2013.01); *C09J 7/29* (2018.01); *E02D 31/008* (2013.01); *B32B 2250/246* (2013.01); *B32B 2264/0207* (2013.01); *B32B 2264/104* (2013.01); *B32B 2272/00* (2013.01); *B32B 2274/00* (2013.01); *B32B 2307/7242* (2013.01); *B32B 2307/7244* (2013.01); *B32B 2307/7246* (2013.01); *B32B 2405/00* (2013.01); *B32B 2556/00* (2013.01); *C09J 2205/114* (2013.01); *C09J 2423/046* (2013.01); *C09J 2429/006* (2013.01); *C09J 2451/006* (2013.01)

(58) Field of Classification Search
CPC ...................................................... B32B 27/32
USPC .......................................................... 428/105
See application file for complete search history.

(56) References Cited

U.S. PATENT DOCUMENTS

| 8,721,814 B2* | 5/2014 | Rodewald | B65D 5/445 |
| | | | 156/60 |
| 2005/0106291 A1* | 5/2005 | Kawashima | B65B 31/00 |
| | | | 426/106 |
| 2008/0233358 A1 | 9/2008 | Garcia | |

(Continued)

OTHER PUBLICATIONS

"Accessories—Seaming Tapes & Attachment Items for Plastic Sheeting", (c) 2014 Raven Industries Inc., (2014), 2 pgs.

(Continued)

*Primary Examiner* — Brent T O'Hern
(74) *Attorney, Agent, or Firm* — Schwegman Lundberg & Woessner, P.A.

(57) ABSTRACT

A barrier tape comprises a barrier section comprising one or more barrier layers and one or more adhesive layers adhered to a face of the barrier section. The barrier tape can be used to join together adjacent barrier sheets or to patch a breach in a barrier sheet to form a barrier assembly.

19 Claims, 4 Drawing Sheets

(51) Int. Cl.
    *B32B 27/20*    (2006.01)
    *C09J 7/29*     (2018.01)

(56) References Cited

U.S. PATENT DOCUMENTS

| | | |
|---|---|---|
| 2011/0229722 A1 | 9/2011 | Rivett et al. |
| 2013/0045353 A1 | 2/2013 | Menage |
| 2014/0272320 A1* | 9/2014 | Garcia ............... B29D 99/0053 428/189 |
| 2016/0243800 A1 | 8/2016 | Kolbasuk et al. |

OTHER PUBLICATIONS

"U.S. Appl. No. 15/052,448, Examiner Interview Summary dated Mar. 2, 2018", 3 pgs.

"U.S. Appl. No. 15/052,448, Final Office Action dated Apr. 6, 2018", 7 pgs.

"U.S. Appl. No. 15/052,448, Non Final Office Action dated Dec. 7, 2017", 7 pgs.

"U.S. Appl. No. 15/052,448, Response filed Mar. 6, 2018 to Non Final Office Action dated Dec. 7, 2017", 14 pgs.

"U.S. Appl. No. 15/052,448, Response filed Nov. 14, 2017 to Restriction Requirement dated Sep. 14, 2017", 8 pgs.

"U.S. Appl. No. 15/052,448, Restriction Requirement dated Sep. 14, 2017", 7 pgs.

"Radon diffusion coefficient in the membrane RAVEN VBP-20 carried out in accordance with the method K124/02/95", Test Report No. 124026/2009, Czech Technical University in Prague, Czech Republic, (Oct. 20, 2009), 3 pgs.

"VaporBlock(r) Pius tm Underslab Vapor Retarder / Gas Barrier Installation Checklist", Raven Engineered Films Division, (Jul. 2013), 1 pg.

"VaporBlock(r) Plus tm Underslab Vapor Retarder / Gas Barrier Installation Guidelines", (c) 2013 Raven Industries Inc., (2013), 4 pgs.

"Vaporblock(r) Plus tm VBP20", (c) 2012 Raven Industries Inc., (2012), 2 pgs.

"VaporBoot Plus Installation Instructions", Raven Engineered Films Division, (Feb. 2014), 1 pg.

Libby, Dan, "Testing 5391 White PE Vapor Bond Tape to ASTM D3833", Berry Plastics CPG Proprietary Information, (Feb. 23, 2009), 2 pgs.

\* cited by examiner

BARRIER TAPE FOR SEAMING AND REPAIR OF BARRIER SHEETS

CROSS-REFERENCE TO RELATED APPLICATION

This application is a divisional of U.S. patent application Ser. No. 15/052,448, filed Feb. 24, 2016, which claims priority under 35 U.S.C. § 119(e) to U.S. Provisional Patent Application No. 62/119,864, filed on Feb. 24, 2015, which applications are incorporated by reference herein in their entirety.

BACKGROUND

Membranes can be used to provide a barrier to moisture and other materials, such as radon or methane. For example, a barrier membrane can be positioned underneath concrete slabs and foundations or outside of vertical foundations to retard moisture penetration through those structures. For example, barriers placed under concrete slabs and foundations, often referred to as "underslab vapor barriers" or simply "underslab barriers," can prevent or greatly reduce water vapor and other naturally occurring gases, such as radon, methane, or volatile organic compounds (VOCs) from penetrating into and through the concrete slab or foundation, which can damage the structure or be harmful to inhabitants in the building.

SUMMARY

The present disclosure describes a barrier tape that can be used for seaming between adjacently positioned barrier membranes, such as underslab vapor barriers, or to repair holes in a barrier membrane. The barrier tape includes a barrier portion comprising one or more barrier-forming layers, and an adhesive portion comprising one or more adhesive layers.

A barrier tape is described herein comprises a barrier section comprising one or more barrier layers and one or more adhesive layers adhered to a face of the barrier section.

A barrier assembly is also described herein, the barrier assembly comprising a first barrier sheet, a second barrier sheet overlapping the first barrier sheet along a seam, and one or more pieces of barrier tape joining the first and second barrier sheets along the seam. Each piece of the barrier tape comprises a barrier section comprising one or more barrier layers; and one or more adhesive layers adhered to a face of the barrier section.

Another barrier assembly is described herein comprising a barrier sheet comprising a breach therethrough and one or more pieces of barrier tape covering the breach. Each piece of the barrier tape comprises a barrier section comprising one or more barrier layers, and one or more adhesive layers adhered to a face of the barrier section.

Yet another barrier assembly is described herein comprising a barrier sheet comprising a breach therethrough, a barrier patch covering the breach, and one or more pieces of barrier tape joining the barrier patch to the barrier sheet. Each piece of the barrier tape comprises a barrier comprising one or more barrier layers, and one or more adhesive layers adhered to a face of the barrier section.

DETAILED DESCRIPTION

In the following Detailed Description, reference is made to the accompanying drawings which form a part hereof. The drawings show, by way of illustration, specific examples in which the barrier tapes described herein can be practiced. These examples are described in sufficient detail to enable those skilled in the art to practice, and it is to be understood that other embodiments can be utilized and that structural changes can be made without departing from the scope of the present disclosure. Terms indicating direction, such as front, rear, left, right, up, and down, are generally used only for the purpose of illustration or clarification and are not intended to be limiting. The following Detailed Description is not to be taken in a limiting sense, and the scope of the present disclosure is defined by the appended claims and their equivalents.

This disclosure describes barrier tapes that can be used for joining adjacent barrier sheets together at a seam, e.g., so that the barrier sheets can cover a larger area, or for patching holes in a barrier sheet. Examples of barrier sheets that can be used with the barrier tapes described herein include, but are not limited to, underslab barrier sheets, such as the barrier sheet sold under the trademark VAPOR BLOCK PLUS sold by Raven Industries, Inc., Sioux Falls, S. Dak., USA, such as the VAPOR BLOCK PLUS 20; barrier geomembranes, row mulch barriers; external wall vapor barriers, and the like. The barrier tapes described herein can include one or more barrier layers that can retard migration of water vapor and other compounds, such as methane or radon, in substantially the same way that the barrier sheets that the barrier tape is seaming or repairing.

Figure 1:
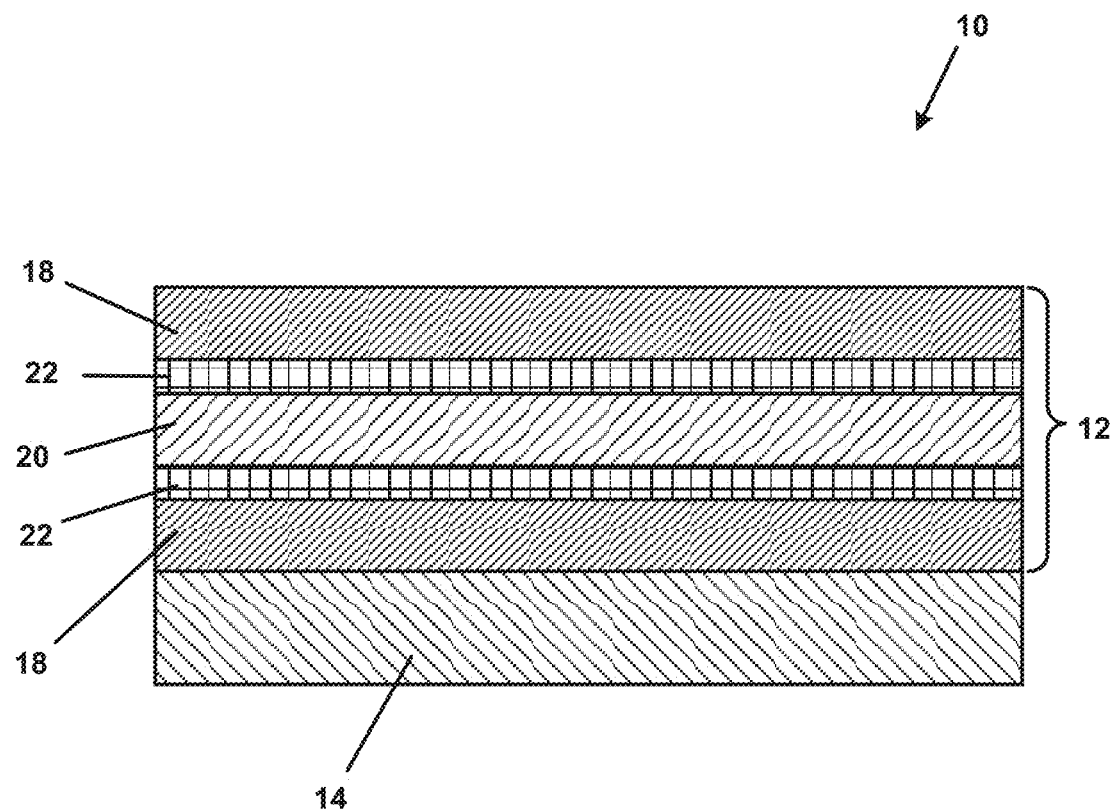
FIG. 1 is a cross-sectional side view of an example barrier tape.

FIG. 1 shows a cross-sectional side view of an example barrier tape 10. The barrier tape 10 can include a barrier section 12 that provides a barrier to water vapor and at least one of methane, radon, and volatile organic compounds (VOCs), such as benzene, ethylbenzene, toluene, and xylene (e.g., BETX compounds), or halogenated hydrocarbons. In an example, the barrier section 12 provides a barrier to water vapor and at least two of methane, radon, benzene, ethyl benzene, toluene, and xylene. In an example, the barrier section 12 provides a barrier to water vapor and at least three of methane, radon, benzene, ethyl benzene, toluene, and xylene. In an example, the barrier section 12 provides a barrier to water vapor and at least four of methane, radon, benzene, ethyl benzene, toluene, and xylene. In an example, the barrier section 12 provides a barrier to all of water vapor, methane, radon, benzene, ethyl benzene, toluene, and xylene. The barrier tape 10 also includes one or more adhesive layers 14 on a first face of the barrier section 12, with FIG. 1 showing a single adhesive layer 14. The one or more adhesive layers 14 allow the barrier tape 10 to be adhered to other structures, such as a barrier sheet (as described below with respect to FIGS. 2-7).

The barrier section 12 includes one or more layers configured to provide a barrier to one or more compounds or compositions to which the barrier tape 10 is intended to provide a barrier. In an example, the barrier section 12 includes one or more generally non-polar layers, such as one or more non-polar layers 18 formed predominantly from a non-polar material, such as a polyolefin, for example polyethylene (PE) or polypropylene (PP). In an example, each of the one or more non-polar layers 18 can be formed entirely or substantially entirely with polyethylene and will, therefore, be referred to herein as a polyethylene layer 18 for the sake of brevity. The use of a generally non-polar material, such as polyethylene, can allow the barrier tape 10 to provide a barrier to polar materials, such as water ($H_2O$) or polar pollutants, either alone or dissolved in water or another polar solvent. Non-polar materials, such as polyethylene, are known, however, to have generally poor barrier properties with respect to gases, such as oxygen gas ($O_2$) or to non-polar materials, such as benzene ($C_6H_6$), radon (Rn), methane ($CH_4$), VOCs, and other non-polar pollutants. Polyolefins, such as polyethylene can also provide for relatively high impact strength and resistance to tearing, in particular if a relatively low-density polyolefin is used. Examples of low-density polyolefins that can be used include, but are not limited to, one or more of low-density polyethylene (LDPE), linear low-density polyethylene (LLDPE), metallocene linear low-density polyethylene (mLLDPE), very-low density polyethylene (VLDPE), or ultra-low density polyethylene (ULDPE) plastomer polymers, or polyolefins other than polyethylene with similar densities.

In order to also provide a barrier to non-polar materials or gases, such as non-polar pollutants, the barrier tape 10 also includes one or more generally polar layers, such as one or more polar layers 20 formed predominantly from a polar material capable of providing a barrier to non-polar compounds, such as ethylene vinyl alcohol (EVOH), nylon, polyester, polyethylene terephthalate (PET), poly-vinyl alcohol (PVOH), or polyvinylidene chloride (PVDC). In an example, each of the one or more polar layers 20 can be formed entirely or substantially entirely with EVOH and will, therefore, be referred to herein as an EVOH layer 20 for the sake of brevity. However, it will be understood that the one or more polar layers 20 could comprise multiple layers of different materials, such as one or more nylon layers adjacent to one or more EVOH layers. In an example, the one or more polar layers 20 can comprise two outer nylon layers with one or more EVOH layers sandwiched between the outer nylon layers, or vice versa, two outer EVOH layers that sandwich one or more nylon layers. The use of a generally polar material, such as EVOH or nylon, can allow the barrier tape 10 to provide a barrier to non-polar materials, including non-polar pollutants such as benzene, radon, and methane. Polar materials, such as EVOH or nylon, are known, however, to have poor barrier properties with respect to polar materials, such as water vapor. The combination of the one or more non-polar layer 18, such as the polyethylene layers 18, and the one or more polar layers 20, such as one or more EVOH layers 20, can allow the barrier tape 10 to provide a barrier to both polar materials, including water vapor and polar pollutants, and non-polar materials, including non-polar pollutants such as benzene, radon, methane, and other VOCs.

Because the one or more non-polar layers 12 are formed from a non-polar compound, e.g., a polyolefin, such as polyethylene, and the one or more polar layers 20 are formed from a polar compound, e.g., EVOH, a non-polar layer 18 typically will not bond or be joined directly with a polar layer 20. Therefore, the barrier section 12 of the barrier tape 10 can also include one or more tie layers 22 that can bond to both the non-polar layers 18 and the polar layers 20. The composition of each tie layer 22 can depend on the corresponding composition of the non-polar layer 18 and the polar layer 20 that the tie layer 22 is bonding together. The composition of a particular tie layer 22 can be chosen so that it can form a mechanical bond or chemical bond, or both, with both the non-polar layer 18 and the polar layer 20. For example, wherein the one or more non-polar layers 18 comprise polyethylene and the one or more polar layers 20 comprise EVOH, the one or more tie layers 22 can comprise polyethylene grafted with maleic anhydride (MA). The polyethylene of the tie layer 22 can directly bond to the polyethylene so that the tie layer 22 will be bonded to the polyethylene layer 18. The maleic anhydride grafts can form an ester bond with the EVOH in the EVOH layer 20 so that the tie layer 22 will be bonded to the polar layer 20, e.g., so that the barrier section 12 forms a single structure with all layers 18, 20, 22 bonded together.

In an example, shown in FIG. 1, the barrier section 12 can comprise a five-layer structure comprising outer polyethylene layers 18 and an inner EVOH layer 20 with a tie layer 22 between the EVOH layer 20 and each polyethylene layer 18. Each layer 18, 20, 22 of the barrier section 12 depicted in FIG. 1 can comprise one or more separate layers of the material forming the layer 18, 20, 22. For example, one or both of the outer polyethylene layers 18 can comprise two co-extruded polyethylene layers that combine to form the polyethylene layer 18 in the barrier section 12. In an example, the non-polar material of the non-polar layers 18 (e.g., a polyolefin such as polyethylene), the polar material of the polar layer 20 (e.g., EVOH), and the material of the tie layers 22 (e.g., maleic anhydride grafted polyethylene) can be co-extruded into the film that forms the barrier section 12 in a co-extrusion die. After forming the barrier section 12, such as via co-extrusion, the adhesive layer 14 can be applied to a face of the barrier section 12.

In an example, the barrier section 12 can have an overall thickness of from about 2 mils (about 0.05 millimeters (mm)) to about 40 mils (about 1 mm), such as from about 5 mils (about 0.13 mm) to about 20 mils (about 0.5 mm), such as from about 7 mils (0.18 mm) to about 10 mils (about 0.25 mm). In an example, the total thickness of the one or more polar layers 20 (e.g., the thickness of the single polar layer 20 shown in FIG. 1, or the sum of the thicknesses of all the polar layers 20 if there are a plurality of polar layers 20) is from about 2% to about 20% of the total thickness of the barrier section 12, such as from about 3% to about 10%, such as about 4% or about 5% of the thickness of the barrier section 12. In an example, the tie layers 22 can have a total thickness of from about 2% to about 10% of the total thickness of the barrier section 12, such as from about 4% to about 5% of the thickness of the barrier section 12. The balance of the thickness of the barrier section 12 can be the non-polar layers 18, e.g., the polyethylene layers 18, which can be, for example, from about 60% to about 96% of the thickness of the barrier section 12, such as from about 80% to about 90%, for example about 88% of the thickness of the barrier section 12.

In an example, the one or more non-polar layers 18 can comprise a polyolefin having a base density of from about 0.85 grams per cubic centimeter ($g/cm^3$) to about 0.97 $g/cm^3$, such as from about 0.875 $g/cm^3$ to about 0.932 $g/cm^3$, for example from about 0.91 g/cm³ to about 0.92 g/cm³, such as from about 0.912 g/cm³ to about 0.920 g/cm³. However, the overall density of the non-polar layers 18 can be varied outside of these ranges, for example with the addition of additives, such as stabilizers, colorants, or fillers, which can increase the overall density of the layer 18. In an example, the one or more polar layers 20 can comprise a polar material, such as EVOH or nylon, having a base density from about 1 g/cm³ to about 1.5 g/cm³, such as from about 1.1 g/cm³ to about 1.25 g/cm³, such as about 1.17 g/cm³. However, like the one or more non-polar layers 18, the overall density of the one or more polar layers 20 can be altered by the addition of stabilizers, colorants, or fillers. In an example, the tie layers 22 can comprise a material having a base density of from about 0.85 g/cm³ to about 1 g/cm³, such as from about 0.875 g/cm³ to about 0.95 g/cm³, for example about 0.91 g/cm³. As mentioned above, additives can be added to each layer 18, 20, 22, if desired. Additives can include stabilizers, such as phosphate stabilizers or phenolic stabilizers. In some examples, a UV or other light stabilizer can be added to one or more layers 18, 20, 22 of the barrier section 12 to protect the barrier section 12 in the event that the barrier tape 10 is to be left out in the sun for an extended period of time.

Fillers can be added to any of the layers 18, 20, 22, for example to modify the density of the layer 18, 20, 22. e.g., to increase or decrease the overall density, to reduce the overall cost of a layer 18, 20, 22, or to improve a material property such as toughness. Examples of fillers include, but are not limited to, calcium carbonate or ground-up recycled materials, such as recycled rubber or other plastics.

The barrier properties of the barrier section 12 can be similar to those of the barrier sheets that the barrier tape 10 is intended to seam or repair. For example, the barrier tape 10 can be specified for use with underslab barrier sheets, which are often specified based on barrier properties with respect to the transmission of water vapor, radon, methane, VOCs, and oxygen.

The transmission of water vapor through the barrier section 12 can be defined as a water vapor transmission rate (WVTR), for example as defined by ASTM standard test method E96 or ASTM standard test method F1249. In an example, the barrier section 12 has a WVTR of about 0.004 grams per hour per square meter (g/hr-m²) or less, such as about 0.003 g/hr-m² or less, for example about 0.0028 g/hr-m² or less.

The transmission of radon (Rn) through the barrier section 12 can be defined as a diffusion coefficient for radon, for example as defined by the K124/02/95 test method accredited by the Czech Accreditation Institute. In an example, the barrier section 12 can have a diffusion coefficient for radon of no more than $1.5 \times 10^{-13}$ square meters per second (m²/s) (e.g., $1.5 \times 10^{-13}$ m²/s or less, such as $1.3 \times 10^{-13}$ m²/s or less, for example $1.1 \times 10^{-13}$ m²/s or less.

The transmission of methane ($CH_4$) through the barrier section 12 can be defined as the permeability coefficient of the material to methane, also referred to as methane permeance, for example as defined by ASTM standard test method D1434. In an example, the barrier section 12 has a methane permeance of $2 \times 10^{-10}$ square meters per day per atmosphere (m²/day·atm) or less, such as $1.7 \times 10^{-10}$ m²/day·atm or less. Barrier properties of the barrier section 12 with respect to methane can also be defined as the gas transmission rate (GTR). In an example, the gas transmission rate is 0.4 milliliters per square meter per day per atmosphere (ml/m²·day·atm) or less, such as 0.32 ml/m²·day·atm or less.

The transmission of volatile organic compounds, such as benzene, ethyl benzene, toluene, or xylene, through the barrier section 12 can be defined as a permeability coefficient for each compound. In an example, the barrier section 12 has a permeability coefficient for benzene of $10 \times 10^{-13}$ m²/s or less, such as about $7 \times 10^{-13}$ m²/s or less, for example about $6 \times 10^{-13}$ m²/s, such as about $5 \times 10^{-13}$ m²/s or less, for example about $4 \times 10^{-13}$ m²/s or less. In an example, the barrier section 12 has a permeability coefficient for toluene of about $15 \times 10^{-13}$ m²/s or less, such as about $10 \times 10^{-13}$ m²/s or less, for example about $8 \times 10^{-13}$ m²/s or less. In an example, the barrier section 12 has a permeability coefficient for ethyl benzene of about $35 \times 10^{-13}$ m²/s or less, such as about $30 \times 10^{-13}$ m²/s or less, for example about $27 \times 10^{-13}$ m²/s or less. In an example, the barrier section 12 has a permeability coefficient for xylene (e.g., a mix of ortho-, meta-, and para-xylenes) of about $30 \times 10^{-13}$ m²/s or less, such as about $25 \times 10^{-13}$ m²/s or less, for example about $21 \times 10^{-13}$ m²/s or less.

The transmission of oxygen gas ($O_2$) through the barrier section 12 can be defined as the $O_2$ transmission rate, for example as described by ASTM standard test D3985. In an example, the barrier section 12 can have an $O_2$ transmission rate of about 2 cubic centimeters per square meter per day (cm³/m²·day) or less, such as about 1.5 cm³/m²·day or less, for example about 1 cm³/m²·day or less, such as 0.9 cm³/m²·day or less. The transmission of $O_2$ through the barrier section 12 can also be defined as the $O_2$ permeation, for example as described by ASTM standard test D3985. In an example, the $O_2$ permeation can be about 25 cubic centimeter mils per square meter per day (cm³·mil/m²·day) or less, such as about 20 cm³·mil/m²·day or less, for example about 15 cm³·mil/m²·day or less, such as about 10 cm³·mil/m²·day or less, for example about 9 cm³·mil/m²·day or less.

In an example, these permeability coefficients for the barrier section 12 can be compared to a barrier sheet made just from polyethylene (e.g., a LLDPE barrier), which can have a permeability coefficient as high as $600 \times 10^{-13}$ m²/s for benzene, as high as $800 \times 10^{-13}$ m²/s for toluene, as high as $1100 \times 10^{-13}$ m²/s for ethyl benzene, and as high as $900 \times 10^{-13}$ m²/s for xylene (e.g., a mix of ortho-, meta-, and para-xylenes), and an $O_2$ transmission rate of greater than 200 cm³/m²·day.

In an example, the barrier tape 10 can be relatively resistant to tearing. In an example, the barrier tape 10 has a tear resistance, such as is measured by tongue tear testing under ASTM standard test D751, of at least about 15 Newtons (about 3.4 pounds force ($lb_f$)), such as at least about 20 Newtons (about 4.5 $lb_f$), for example at least about 25 Newtons (about 5.6 $lb_1$), such as at least about 25.8 Newtons (about 5.8 $lb_f$), for example about 26.2 Newtons (about 5.88 $lb_f$).

The one or more adhesive layers 14 can comprise any adhesive material that will adhere to the barrier section 12. e.g., to an outer layer of the barrier section 12 such as one of the non-polar layers 18 or one of the polar layers 20. In an example, the adhesive material of the one or more adhesive layers 14 can comprise an adhesive that relatively strongly adheres to polyolefins of the non-polar layers 18, such as polyethylene. In an example, the one or more adhesive layers 14 can comprise a pressure sensitive adhesive, such as an acrylic-based pressure sensitive adhesive, a synthetic elastomeric pressure sensitive adhesive, or a rubber-based pressure sensitive adhesive. However, other adhesives can be used without varying from the scope of the present disclosure.

The adhesive layer 14 can have an adhesive strength. e.g., an adhesion value as measured by the peel adhesion testing under the Pressure Sensitive Tape Council (PSTC) standard test PSTC 101, of at least about 30 ounces-force per inch (oz./in.) to steel, such as at least about 35 oz./in., for example at least about 40 oz./in., such as at least about 50 oz./in, for example at least about 55 oz./in., such as at least about 60 oz./in., for example at least about 64 oz./in., such as at least about 65 oz./in., for example at least about 70 oz./in., such as at least about 80 oz./in., for example at least about 90 oz./in., such as at least about 100 oz./in., for example at least about 125 oz./in., such as at least about 140 oz./in., for example at least about 144 oz./in., such as at least 150 oz./in. (with all adhesion values being measured for the adhesive to steel).

The thickness of the one or more adhesive layers 14 can be selected to be large enough so that the one or more adhesive layers 14 provide adequate adhesion to the barrier section 12 and to the surface to which the barrier tape 10 is being adhered, including the ability to properly adhere to more irregular surfaces (such as those that can be present on a rough surface such as concrete). However, in some examples, the thickness of the one or more adhesive layers 14 can be selected to not be so large as to overly adversely affect the overall barrier properties of the barrier tape 10, e.g., because the adhesive layer 14 can provide a pathway through the adhesive through which materials can diffuse or permeate. In an example, the thickness of the one or more adhesive layers 14 can be from about 2 mils (about 0.05 mm) to about 20 mils (about 0.5 mm), such as from about 5 mils (about 0.13 mm) to about 17 mils (about 0.43 mm).

The barrier tape 10 can have a width that is large enough to provide for seaming between adjacent barrier sheets (as described below with respect to FIGS. 2 and 3) and to provide for direct taping over of at relatively small defects in a barrier sheet (as described below with respect to FIGS. 4 and 5). In an example, the barrier tape has a width of at least about 5 centimeters (cm) (about 2 inches), such as at least about 10 cm (about 4 inches), for example at least about 15 cm (at least about 6 inches). In an example, the barrier tape 10 can have a width that is no more than about 45 cm (about 18 inches), such as no more than about 30 cm (about 12 inches), such as no more than about 15 cm (less than or equal to about 6 inches).

Figure 2:
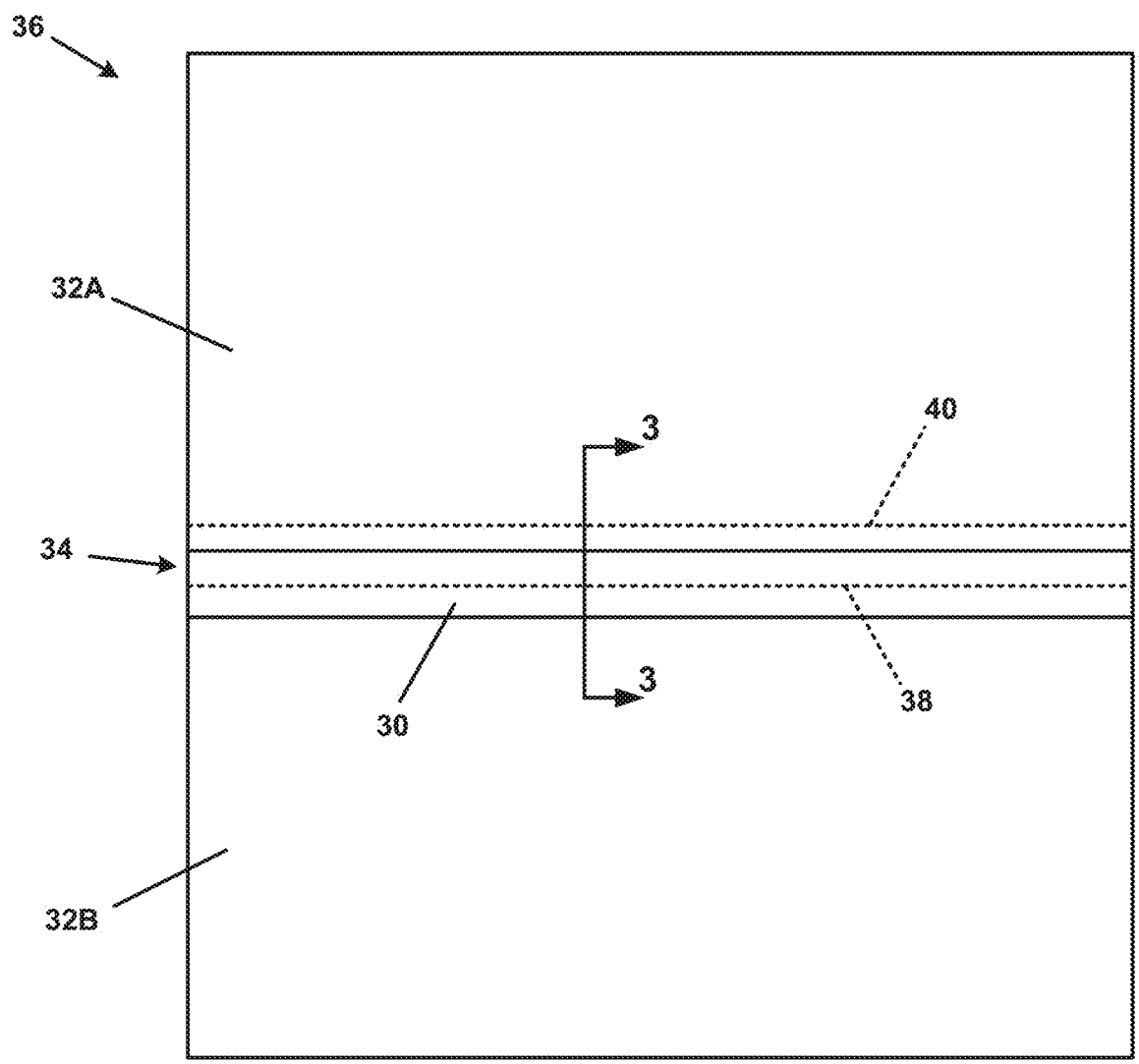
FIG. 2 is a top view of the example barrier tape joining together two adjacent barrier sheets along a seam.

As mentioned above, the one or more adhesive layers 14 allow the barrier tape 10 to be adhered to another structure. For example, FIG. 2 shows a top view of an example barrier tape 30 being used to join together adjacent first and second barrier sheets 32A and 32B (collectively referred to herein as "barrier sheets 32") along a seam 34, also referred to as "seaming" the barrier sheets 32A, 32B. The barrier tape 30 can have a configuration as described above with respect to barrier tape 10 in FIG. 1. Seaming the barrier sheets 32A, 32B with the barrier tape 30 forms a barrier assembly 36 that can provide a barrier to water vapor and at least one non-polar compound, such as methane, radon, or VOCs over a surface area that is larger than either of the individual barrier sheets 32A, 32B. The barrier assembly 36 can be formed by overlapping a lateral edge 38 of the first barrier sheet 32A over a lateral edge 40 of the second barrier sheet 32B so that a lateral portion of the first barrier sheet 32A overlaps a corresponding lateral portion of the second barrier sheet 32B. The barrier tape 30 can then be used to join the first barrier sheet 32A to second lateral film 32B along the seam. The overlapping lateral portions of the first and second barrier sheets 32A and 32B and the barrier tape 30 provide a continuous or substantially continuous barrier to water vapor and at least one of methane, radon, and VOCs throughout the entire barrier assembly 36.

The barrier tape 30 can be used for seaming between either barrier sheet 32A, 32B shown in FIG. 2 and a third barrier sheet 32 to provide an even larger barrier assembly 36. Additional barrier sheets 32 can be joined with the barrier tape 30, 40 until a desired overall size of the barrier assembly 36 has been achieved.

Figure 3:
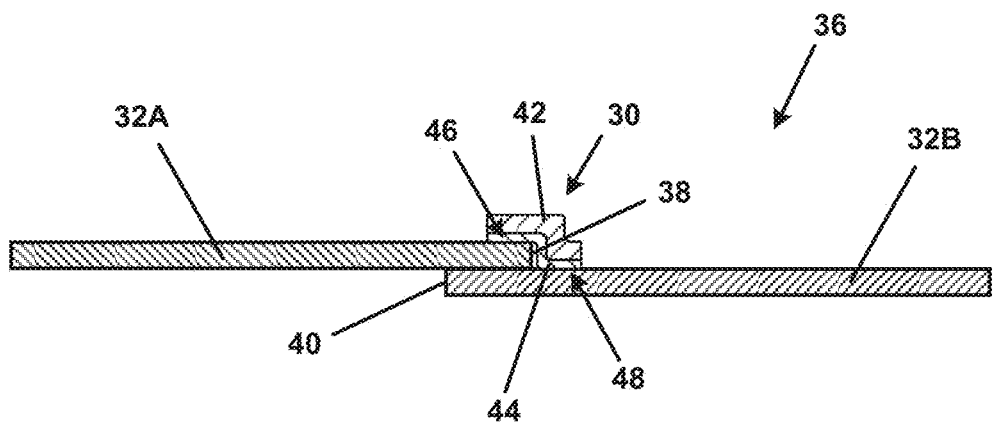
FIG. 3 is cross-sectional side view of the barrier tape and the barrier sheets taken along line 3-3 in FIG. 2.
Figure 4:
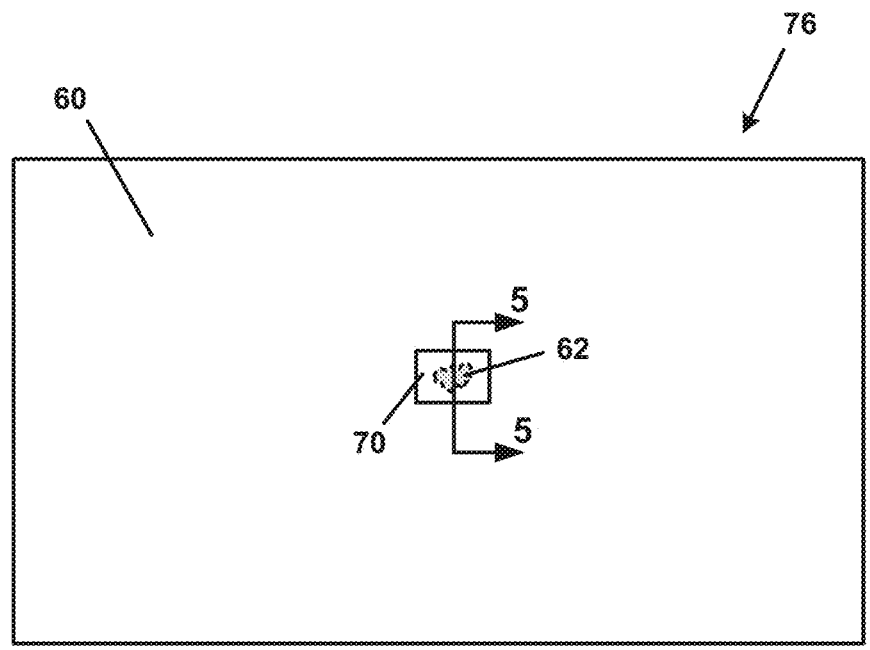
FIG. 4 is a top view of an example barrier tape patching a relatively small hole in a barrier sheet.

FIG. 3 shows a cross-sectional side view of the two barrier sheets 32A. 32B and the barrier tape 30 of FIG. 2. As shown in FIG. 3, the barrier tape 30 includes a barrier section 42 and one or more adhesive layers 44. The barrier section 42 and the adhesive layer 44 can be similar or identical to the barrier section 12 and the adhesive layer 14, respectively, for the barrier tape 10 described with respect to FIG. 1. As shown in the example of FIG. 3, the barrier tape 30 can be placed over the overlapping lateral portion of the first barrier sheet 32A located proximate to the lateral edge 38. The barrier tape 30 can be applied so that the adhesive layer 44 is in contact with a top surface of the first barrier sheet 32A at a first joining interface 46 and with a top surface of the second barrier sheet 32B at a second joining interface 48. The barrier tape 30 spans between the first joining interface 46 and the second joining interface 48 to anchor the first barrier sheet 32A to the second barrier sheet 32B. In addition to the barrier tape 30, the barrier sheets 32A, 32B can be joined by a double-sided tape 50 positioned between the first barrier sheet 32A and the second barrier sheet 32B. The overlapping and spanning barrier tape 30 seals or substantially seals any gap between the first and second barrier sheets 32A. 32B. The barrier properties of the barrier section 42 will act to maintain the barrier to water vapor and at least one of methane, radon, and VOCs that is provided by the barrier sheets 32A, 32B across the entire barrier assembly 34.

The barrier tapes described above can also be used to repair damaged barrier sheets, for example by patching tears or holes in a barrier sheet. FIG. 4 shows a top view of a barrier sheet 60 with a breach in the barrier sheet 60, such as a slit, a cut, a tear, or a hole 62, a slit, cut, where the existence of the breach compromises the integrity of the barrier to water vapor and at least one of methane, radon, and VOCs. A barrier tape 70 can be applied over the hole or other breach 62 to repair the integrity of the barrier. In an example, the hole or other breach 62 is relatively small such that the barrier tape 70 is large enough to completely cover the hole or other breach 62.

Figure 5:
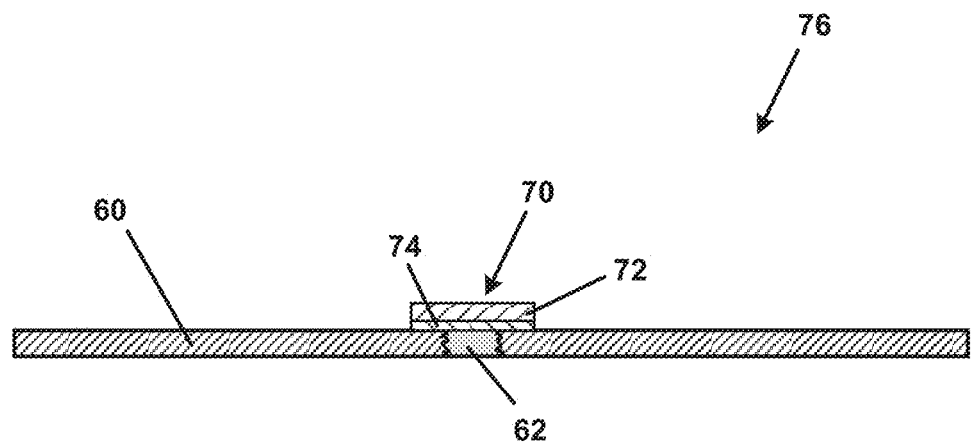
FIG. 5 is a cross-sectional side view of the example barrier tape repairing the small barrier sheet hole taken along line 5-5 in FIG. 4.

FIG. 5 is a cross-sectional side view of the barrier sheet 60 and the barrier tape 70 repairing the relatively small hole or other breach 62 to form a barrier assembly 76. The barrier tape 70 includes a barrier section 72 and one or more adhesive layers 74. The barrier section 72 and the adhesive layer 74 can be similar or identical to the barrier section 12 and the adhesive layer 14, respectively, for the barrier tape 10 described with respect to FIG. 1. The barrier properties of the barrier section 72 will act to maintain the barrier to water vapor and at least one of methane, radon, and VOCs that is provided by the barrier sheet 60 across the entire barrier assembly 76.

Figure 6:
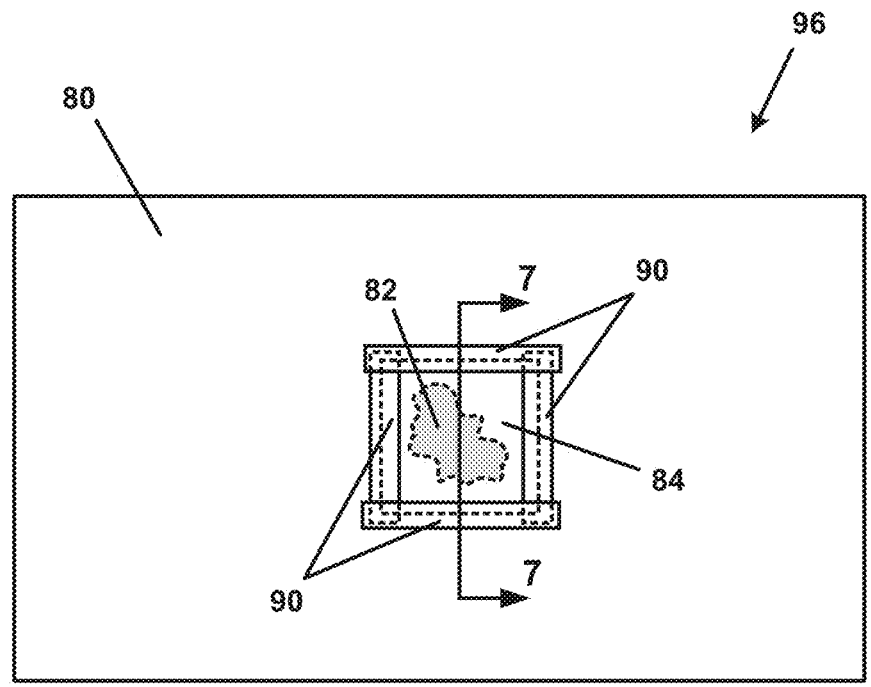
FIG. 6 is a top view of an example barrier tape and a barrier patch repairing a relatively large hole in a barrier sheet.

As noted above, the hole or other breach 62 shown in FIGS. 4 and 5 is relative small, e.g., is smaller than the width of the barrier tape 70. However, in some examples, a breach can be larger than the barrier tape that is on hand for a user. FIG. 6 shows a top view of a barrier sheet 80 with just such a breach, such as a slit, a cut, a tear, or a hole 82. Rather than laying a barrier tape directly over the hole or other breach 82, a barrier patch 84 can be used in conjunction with one or more barrier tape pieces 90. The barrier patch 84 can be a piece of barrier sheet, such as a barrier sheet that is substantially identical to the barrier sheet 80 being patched. The barrier tape pieces 90 can be applied around the barrier patch 84 to join and seal the barrier patch 84 to the barrier sheet 80.

Figure 7:
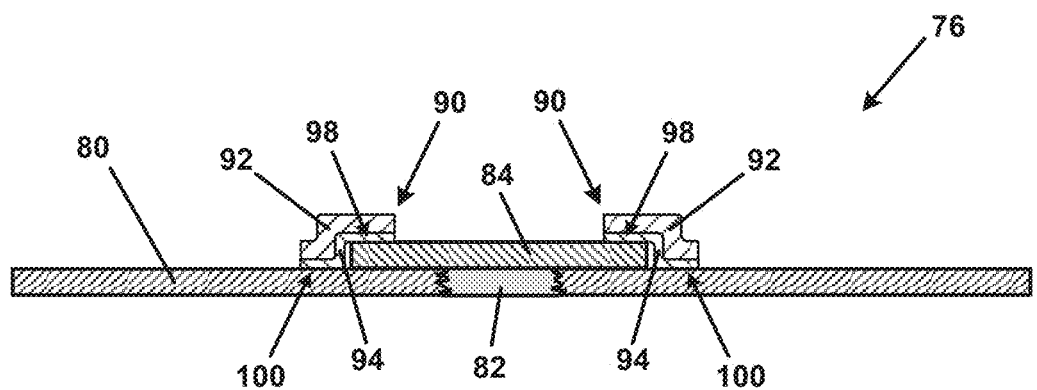
FIG. 7 is a cross-sectional side view of the example barrier tape repairing the large barrier sheet hole taken along line 7-7 in FIG. 6.

FIG. 7 is a cross-sectional side view of the barrier sheet 80 and the barrier patch 84 and the barrier tape pieces 90 repairing the relatively large hole or other breach 82 to form a barrier assembly 96. Each barrier tape piece 90 includes a barrier section 92 and an adhesive layer 94. The barrier section 92 and the adhesive layer 94 can be similar or identical to the barrier section 12 and the adhesive layer 14, respectively, for the barrier tape 10 described with respect to FIG. 1. In addition to the barrier tape 90, the barrier patch 84 and the barrier sheet 80 can be joined by double-sided tape 102 positioned between the barrier sheet 80 and the barrier patch 84.

The barrier properties of the barrier section 92 will act to maintain the barrier to water vapor and at least one of methane, radon, and VOCs that is provided by the barrier sheet 80 across the entire barrier assembly 96. Each barrier tape piece 90 can be applied so that the adhesive layer 94 is in contact with a top surface of the barrier patch 84 at a first joining interface 98 and with a top surface of the barrier sheet 80 at a second joining interface 100. The barrier tape pieces 90 span between the first joining interface 98 and the second joining interface 100 to anchor the barrier patch 84 to the barrier sheet 80. The overlapping and spanning barrier tape pieces 90 seal or substantially seal any gap between the barrier sheet 80 and the barrier patch 84. The barrier properties of the barrier section 92 of the barrier tape pieces 90 will act to maintain the barrier to water vapor and at least one of methane, radon, and VOCs that is provided by the barrier sheet 80 and the barrier patch 84 across the entire barrier assembly 76.

The barrier tape 10 described herein can be used with other applications or procedures. For example, the barrier tape 10 can be used to join or couple barrier sheets, such as the barrier sheets 32, 60, or 80, to fixtures such as pipes or pipe boots or building structures.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a molding system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A barrier assembly comprising:
a flat or substantially flat first barrier film; and
one or more pieces of barrier tape affixed to the first barrier film, each piece of the barrier tape comprising:
a barrier section comprising one or more inner polar tape layers each formed predominantly from ethylene vinyl alcohol and a pair of outer non-polar tape layers each formed predominantly from polyethylene, wherein a first of the pair of outer non-polar tape layers is positioned on a first side of the one or more inner polar tape layers and a second of the pair of outer non-polar tape layers is positioned on a second side of the one or more inner polar tape layers;
a pair of tape tie layers each formed predominantly from polyethylene grafted with maleic anhydride, each of the pair of tape tie layers being positioned between the one or more inner polar tape layers and a corresponding one of the pair of outer non-polar tape layers; and
one or more adhesive layers adhered to a face of the barrier section.

2. The barrier assembly of claim 1, wherein the first barrier film comprises one or more polar film layers and one or more non-polar film layers.

3. The barrier assembly of claim 2, wherein each of the one or more non-polar film layers comprises a polyolefin and each of the one or more polar film layers comprises ethylene vinyl alcohol.

4. The barrier assembly of claim 1, further comprising a flat or substantially flat second barrier film at least partially overlapping the first barrier film, wherein the one or more pieces of barrier tape join the first barrier film to the second barrier film.

5. The barrier assembly of claim 4, wherein the second barrier film overlaps the first barrier film along a lateral seam, and wherein the one or more pieces of barrier tape join the first and second barrier films along the lateral seam.

6. The barrier assembly of claim 4, wherein the first barrier film comprises a breach therethrough and the second barrier film comprises a barrier film patch covering the breach such that the seam substantially surrounds the breach, wherein the one or more pieces of barrier tape joins the barrier film patch to the first barrier film around a seam.

7. The barrier assembly of claim 4, wherein the second barrier film provides a barrier to water vapor and at least one of methane, radon, and volatile organic compounds.

8. The barrier assembly of claim 4, wherein the second barrier film comprises one or more polar film layers and one or more non-polar film layers.

9. The barrier assembly of claim 8, wherein each of the one or more non-polar film layers comprises a polyolefin and each of the one or more polar film layers comprises ethylene vinyl alcohol.

10. The barrier assembly of claim 4, wherein the second barrier film comprises:
one or more inner polar film layers each formed predominantly from ethylene vinyl alcohol;
a pair of outer non-polar film layers each formed predominantly from polyethylene, wherein a first of the pair of outer non-polar film layers is positioned on a first side of the one or more inner polar film layers and a second of the pair of outer non-polar film layers is positioned on a second side of the one or more inner polar film layers; and
a pair of film tie layers each formed predominantly from polyethylene grafted with maleic anhydride, each of the pair of film tie layers being positioned between the one or more inner polar film layers and a corresponding one of the pair of outer non-polar film layers.

11. The barrier assembly of claim 4, wherein one the flat or substantially flat second barrier film is configured for use in a building construction application or as a barrier geomembrane.

12. The barrier assembly of claim 4, wherein the flat or substantially flat second barrier film is configured as an underslab vapor barrier.

13. A barrier assembly comprising:
a flat or substantially flat first barrier film; and
one or more pieces of barrier tape affixed to the first barrier film;
wherein the first barrier film comprises;
one or more inner polar film layers each formed predominantly from ethylene vinyl alcohol;
a pair of outer non-polar film layers each formed predominantly from polyethylene, wherein a first of the pair of outer non-polar film layers is positioned on a first side of the one or more inner polar film layers and a second of the pair of outer non-polar film layers is positioned on a second side of the one or more inner polar film layers; and
a pair of film tie layers each formed predominantly from polyethylene grafted with maleic anhydride, each of the pair of film tie layers being positioned between the one or more inner polar film layers and a corresponding one of the pair of outer non-polar film layers; and
wherein each of the one or more pieces of the barrier tape comprises:
a tape barrier section comprising one or more polar barrier layers and one or more non-polar barrier layers; and
one or more adhesive layers adhered to a face of the barrier section.

14. The barrier assembly of claim 13, wherein the barrier section of each of the one or more pieces of barrier tape and the first barrier film provides a barrier to water vapor and at least one of methane, radon, and volatile organic compounds.

15. The barrier assembly of claim 13, wherein each of the one or more non-polar barrier layers comprises a polyolefin and each of the one or more polar barrier layers comprises ethylene vinyl alcohol.

16. The barrier assembly of claim 13, wherein the flat or substantially flat first barrier film is configured for use in a building construction application or as a barrier geomembrane.

17. The barrier assembly of claim 13, wherein the flat or substantially flat first barrier film is configured as an under-slab vapor barrier.

18. The barrier assembly of claim 13, further comprising a flat or substantially flat second barrier film at least partially overlapping the first barrier film, wherein the one or more pieces of barrier tape join the first barrier film to the second barrier film.

19. A barrier assembly comprising:
a flat or substantially flat first barrier film with a breach therethrough;
one or more pieces of barrier tape affixed to the first barrier film and covering the breach, each piece of the barrier tape comprising:
a barrier section comprising one or more inner polar tape layers each formed predominantly from ethylene vinyl alcohol and a pair of outer non-polar tape layers each formed predominantly from polyethylene, wherein a first of the pair of outer non-polar tape layers is positioned on a first side of the one or more inner polar tape layers and a second of the pair of outer non-polar tape layers is positioned on a second side of the one or more inner polar tape layers;
a pair of tape tie layers each formed predominantly from polyethylene grafted with maleic anhydride, each of the pair of tape tie layers being positioned between the one or more inner polar tape layers and a corresponding one of the pair of outer non-polar tape layers; and
one or more adhesive layers adhered to a face of the barrier section.

* * * * *